United States Patent
La Fratta et al.

(10) Patent No.: US 6,169,880 B1
(45) Date of Patent: Jan. 2, 2001

(54) METHOD AND SYSTEM OF LOAD SHARING AND PRIORITIZATION OF RADIO REPEATERS

(75) Inventors: Laurence A. La Fratta, Lynchburg; Mark D. Priest, Rustburg, both of VA (US)

(73) Assignee: Ericsson Inc., Research Triangle Park, NC (US)

(*) Notice: Under 35 U.S.C. 154(b), the term of this patent shall be extended for 0 days.

(21) Appl. No.: 08/732,142

(22) Filed: Oct. 16, 1996

(51) Int. Cl.$^7$ ........................................................ H04B 7/15
(52) U.S. Cl. ............................... 455/11.1; 455/9; 455/518
(58) Field of Search ................................. 455/8–9, 11.1, 455/512, 520, 524–525, 527, 453, 436, 343, 574, 38.3, 126, 127, 517, 518

(56) References Cited

U.S. PATENT DOCUMENTS

| | | |
|---|---|---|
| 3,955,140 * | 5/1976 | Stephens et al. .................... 455/11.1 |
| 4,056,779 * | 11/1977 | Toler .................................... 455/11.1 |
| 4,056,780 | 11/1977 | Faulkner . |
| 4,150,334 | 4/1979 | Williams . |
| 4,234,959 | 11/1980 | Andrea, III et al. . |
| 4,383,332 | 5/1983 | Glance et al. . |
| 4,521,912 * | 6/1985 | Franke et al. ......................... 455/126 |
| 4,539,706 | 9/1985 | Mears et al. . |
| 4,553,262 | 11/1985 | Coe . |
| 4,553,272 | 11/1985 | Mears . |
| 4,771,448 | 9/1988 | Koohgoli et al. . |
| 4,905,302 | 2/1990 | Childress et al. . |
| 4,939,746 | 7/1990 | Childress . |
| 4,965,787 | 10/1990 | Almond et al. . |
| 5,010,583 | 4/1991 | Parken . |
| 5,056,152 | 10/1991 | Truby et al. . |
| 5,175,866 | 12/1992 | Childress et al. . |
| 5,239,666 | 8/1993 | Truby . |
| 5,276,686 | 1/1994 | Ito . |
| 5,408,680 | 4/1995 | Hattey et al. . |
| 5,425,030 | 6/1995 | Comroe et al. . |
| 5,428,817 | 6/1995 | Yahagi . |
| 5,430,789 | 7/1995 | Ohgami . |
| 5,487,185 * | 1/1996 | Halonen ..................................... 455/8 |
| 5,519,761 | 5/1996 | Gilhousen . |
| 5,533,029 | 7/1996 | Gardner . |
| 5,548,809 | 8/1996 | Lemson . |
| 5,708,962 * | 1/1998 | MacIntyre et al. ....................... 455/8 |

FOREIGN PATENT DOCUMENTS 0 188 322    7/1986   (EP) .

* cited by examiner

*Primary Examiner*—Nguyen Vo
(74) *Attorney, Agent, or Firm*—Burns, Doane, Swecker & Mathis, L.L.P.

(57) ABSTRACT

A radio communication system assigns one repeater the role of priority repeater, whereupon that priority repeater exclusively relays all messages between one or more portable radios and a base site. The priority repeater monitors various indica relating to its level of activity, and transitions to a non-priority state when the level of activity exceeds a prescribed threshold. In one embodiment, the repeater includes a counter for counting the number of transactions performed since the repeater was assigned the role of priority repeater, wherein the count serves as the activity level measure. In another embodiment, the repeater includes a timer for determining the amount of time which has transpired since the repeater assumed the role of priority repeater, wherein this time value serves as the activity measure. Still another embodiment uses battery level as a proxy for activity level. The above techniques may be employed in a non-trunked type of repeater or a trunked type of repeater. In the later case, the priority repeater transmits a message containing its activity level on a control channel to other idle repeaters in the vicinity. These idle repeaters compare the activity level embedded in the message with their own activity level. If an idle repeater determines that its activity level is higher than the current priority repeater's activity level, then it will transmit a message to the priority repeater requesting that the priority repeater relinquish priority status. In this manner, the present invention ensures that a repeater will not deplete its battery during its tenure as priority repeater.

15 Claims, 6 Drawing Sheets

METHOD AND SYSTEM OF LOAD SHARING AND PRIORITIZATION OF RADIO REPEATERS

REFERENCE TO RELATED APPLICATIONS

The following application is related to Ser. No. 08/694,745, filed on Aug. 9, 1996, entitled "In-band Vehicular Repeater for Trunked Radio System", which is incorporated herein by reference.

BACKGROUND

The present invention relates generally to radio communication systems employing repeaters, and in a particular to a radio communication system and method for sharing repeater processing load between a plurality of radio repeaters.

It is generally desirable to provide "balanced" mobile radio coverage within a radio communication system. A system is "balanced" when each mobile radio that receives messages from a given base site may, in turn, successfully transmit messages to the base site. This goal may be achieved to some extent by appropriately adjusting the location and output power of the base site equipment, as well as the output power of the mobile radios.

However, in many applications it is necessary to communicate between a base site and one or more hand-held portable radios. For instance, foot patrolmen typically carry small portable radios to communicate with a central base site. Also, squad car officers typically carry similar portable radios when leaving their vehicles to investigate an accident, complaint or disturbance. Because of size constraints, these smaller mobile radio units often do not have sufficient power to reach a central base site, thereby preventing balanced coverage.

System designers have addressed this problem through the use of repeaters. In operation, the low power portable radios transmit their messages to a repeater station, where the messages are forwarded to the base site, typically at a higher power level. The repeater station may be mobile. For instance, as illustrated in FIG. 1, messages transmitted by a police officer's 18 portable radio 20 might be transmitted to a repeater (not shown) housed in the officer's squad car 10, and then forwarded to the base site 4. Typically, vehicular repeaters employ a first frequency (f2) when communicating with the portable radios, and a second separate frequency (f1) when communicating with the base site equipment.

However, it is not uncommon to have plural squad cars (e.g. squad cars 10, 12, 14, and 16) report to the same scene at the same time. Each squad car may have its own repeater. As such, there arises the problem of choosing which repeater will relay messages from the portable radios to the base site. Interference will result if more than one repeater station attempts to relay the messages at the same time, because the repeaters typically relay messages from the portable radios to the base site using the same frequencies (f1 and f2).

Traditionally, conventional systems have attempted to mitigate this problem by assigning the role of "priority" repeater to one of the repeaters. All messages transmitted from the portable radios are routed through the priority repeater to the central base site. One way of accomplishing this objective is by using random sampling to select one repeater from a group of repeaters. More specifically, each repeater in the vicinity of a portable radio receives messages transmitted by the portable radio. After receiving a message, each repeater generates an enable signal after a random time delay, and transmits the enable signal to other repeaters in the vicinity. The transmitted enable signal instructs the other repeaters to refrain from relaying the message to the base site. Thus, the first repeater to transmit its enable signal (as determined by the random time delay) will assume the role of "priority" repeater.

However, using random time intervals to choose the priority repeater imposes risks. There is a possibility that two repeaters may generate their enable pulses at the same time, and therefore simultaneously attempt to assume the priority role. Interference will then result. Furthermore, using random time intervals delays communication from the portable radios to the base site.

U.S. Pat. No. 4,056,780 to Faulkner presents one solution to the above noted problems. This system assigns a delay state to each on-scene repeater. The delay state depends on when the repeater came on-scene. That is, a first squad car to arrive at the scene of an accident, complaint or disturbance, is assigned a delay state of 0. Having the lowest delay state, this repeater assumes the role of repeating all portable radio messages to the base site. A second repeater to enter the region will transmit a tone indicating its presence, and assume a delay state of 0. Upon receiving the tone, the first repeater will increment its delay state to 1. Thereafter, when a message is received from a portable radio, each repeater starts a countdown timer. The initial value of the countdown timer is selected on the basis of its delay state. For example, the initial value may correspond to the delay state multiplied by some interval of time (such as 400 ms). Thus, the second repeater having a delay state of 0 will count down first, upon which it will relay the message from the portable radio to the base site. The first repeater will detect the transmission of the second repeater, and in response thereto, refrain from transmitting the message itself. However, if the second repeater leaves the area, the first repeater is allowed to count down to zero and relay the message. In this event, the first repeater will also decrement its delay state to once again assume the 0 state (e.g. thereby assuming the priority role once again).

The above technique decisively arbitrates between repeaters in a given geographic location, but has the negative consequence of depleting the battery supply of the priority repeater. For instance, suppose that three squad cars (equipped with repeaters) report to a scene of an accident. Further assume that all three repeaters remain on-scene for an extended period of time. According to the above described arbitration technique, the last-to-arrive repeater is assigned the role of priority repeater. This last-to-arrive repeater will remain the priority repeater for the entire length of the investigation. Operating one repeater for such an extended period of time may deplete its battery supply. Since repeaters are typically powered by the vehicle battery, the officer may return to his vehicle to find its battery depleted and the vehicle thereby rendered inoperative.

U.S. Pat. No. 5,056,152 to Truby attempts to solve this problem by discriminating between primary and secondary repeater units. Primary repeater units are housed within squad cars which typically have large enough batteries to power the repeater for extended periods of time. Secondary repeater units are housed within motorcycles (or like vehicles), which typically employ smaller batteries with shorter longevity. The technique taught by Truby assigns the role of priority repeater to a secondary repeater only if no primary repeaters are available. More specifically, the role of priority repeater is allocated to one of the on-scene primary repeaters according to the technique disclosed in the above-described U.S. Pat. No. 4,056,780. If no primary repeater is available, the first secondary unit to respond to the request assumes the role of priority repeater. That is, each secondary unit includes a count-down timer. When a request is entered for the services of a secondary repeater, each secondary repeater commences counting down. Each secondary repeater's count-down is governed by the software system of the repeater. The repeaters are not synchronized. Thus, the patentee asserts that it would be statistically unlikely that two specialized radios would count down to zero at the same time. The secondary repeater which does count down to zero first is assigned the role of relaying messages to the base site.

While it may be uncommon that two or more repeaters could simultaneously relay a message to the base site, the importance of message integrity in many applications demands assurances that this event will not happen. Furthermore, this technique may still deplete the battery of a primary repeater.

Accordingly, it is an exemplary objective of the present invention to ensure that two repeaters do not simultaneously assume the role of priority repeater. It is another exemplary objective of the present invention to allocate the role of priority repeater in a radio communication system in a manner which distributes the processing burden evenly between all on-scene repeaters.

SUMMARY

These and other exemplary features are achieved through a radio communication system which assigns one repeater the role of priority repeater, whereupon that priority repeater exclusively relays all messages between one or more portable radios and a base site. The priority repeater monitors various indica relating to its level of activity, and transitions to a non-priority state when the level of activity exceeds a prescribed threshold. In one embodiment, the repeater includes a counter for counting the number of transactions performed since the repeater was assigned the role of priority repeater, wherein the count serves as the activity level measure. In another embodiment, the repeater includes a timer for determining the amount of time which has transpired since the repeater assumed the role of priority repeater, wherein this time value serves as the activity measure. Still another embodiment uses battery level as a proxy for activity level.

The above techniques may be employed in a non-trunked type of repeater or a trunked type of repeater. In the later case, the priority repeater transmits a message containing its activity level on a control channel to other idle repeaters in the vicinity. These idle repeaters compare the activity level embedded in the message with their own activity level. If an idle repeater determines that its activity level is higher than the current priority repeater's activity level, then it will transmit a message to the priority repeater requesting that the priority repeater relinquish priority status. In this manner, the present invention ensures that a repeater will not deplete its battery during its tenure as priority repeater.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
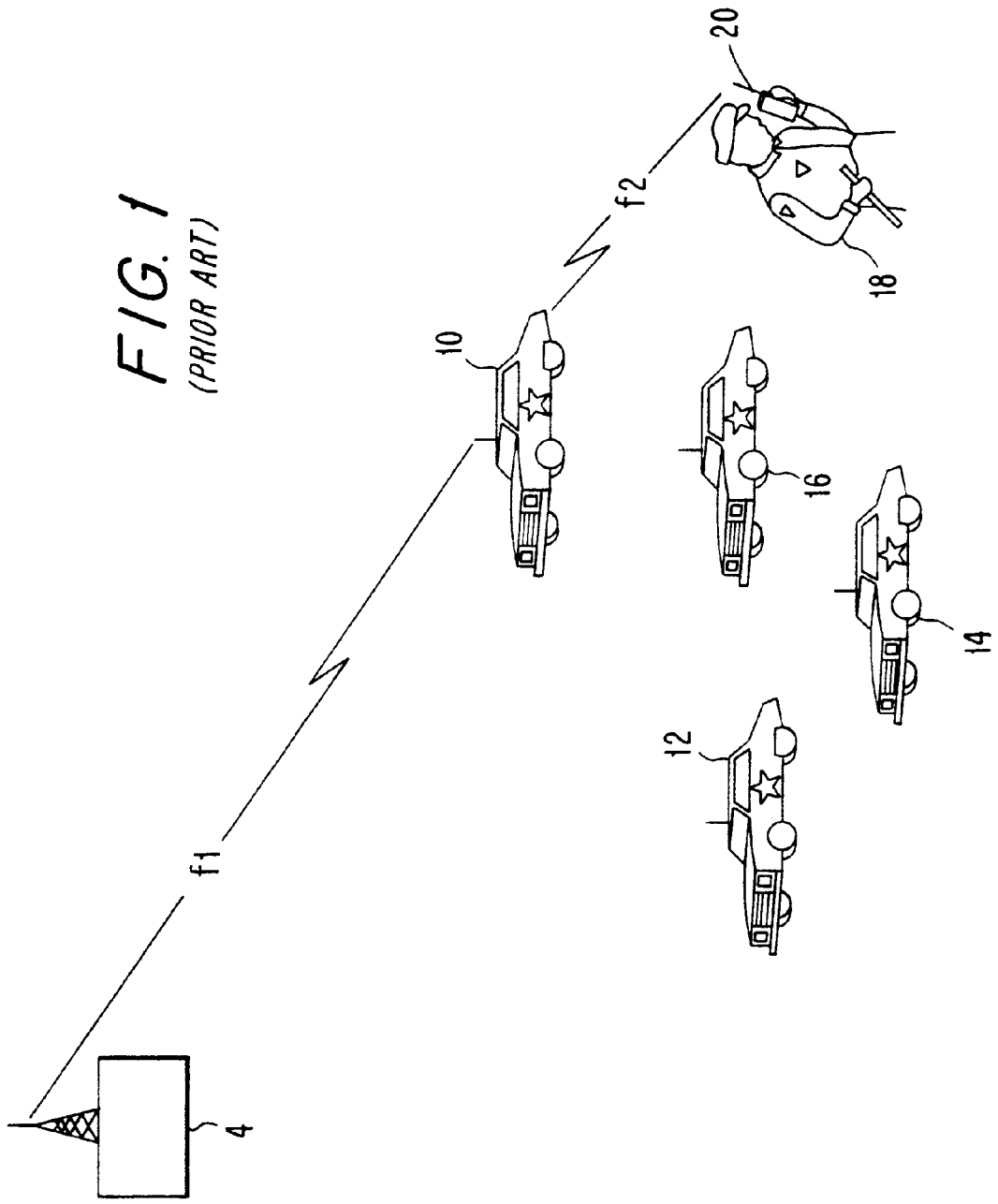
FIG. 1 shows an exemplary radio communication system depicting the use of a vehicular repeater.
Figure 2:
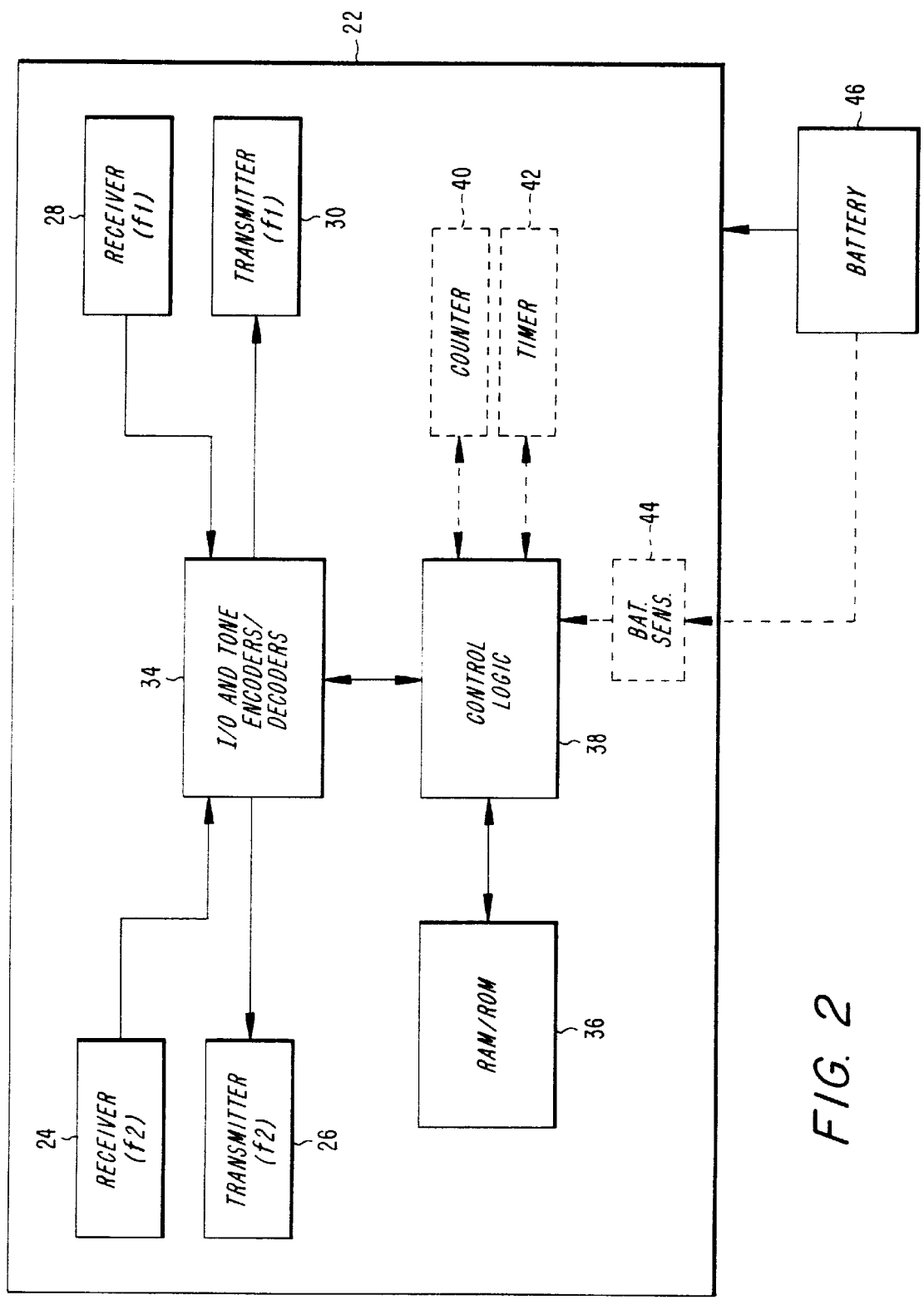
FIG. 2 shows an exemplary non-trunked repeater for use in the present invention.

FIG. 2 shows an exemplary repeater 22 for use in the present invention. The repeater 22 includes a receiver 24 for receiving messages from the portable radio (not shown) using frequency (f2). These messages are routed through I/O circuitry 34 and forwarded to the base site (not shown) using transmitter 30 on frequency (f1). Similarly, messages received from the base site are received by receiver 28 using frequency (f1). These messages are routed through I/O circuitry 32 to transmitter 26, where the messages are transmitted to the portable radios on frequency (f2). The routing of messages through the I/O circuitry 34 is controlled by control logic 38. Control logic 38 may comprise a conventional microprocessor which performs a program stored in memory 36. These hardware components are familiar to those having skill in the art, and thus are not described in detail.

In addition to the above noted components, the repeater 22 includes a battery sensing circuitry 44 for determining a charge state of a battery 46. Further, the repeater includes a counter 40 and a timer 42 communicatively tied to the controller logic 38. As will be described shortly, the repeater 22 may employ the battery sensing circuitry 44, the counter 40 and the timer 42 in determining whether to relay messages from the portable radios to the base site. Alternatively, the repeater 22 may employ only one (or two) of these components. For this reason, these three components are shown with dotted lines to indicate that they are optional.

Figure 3:
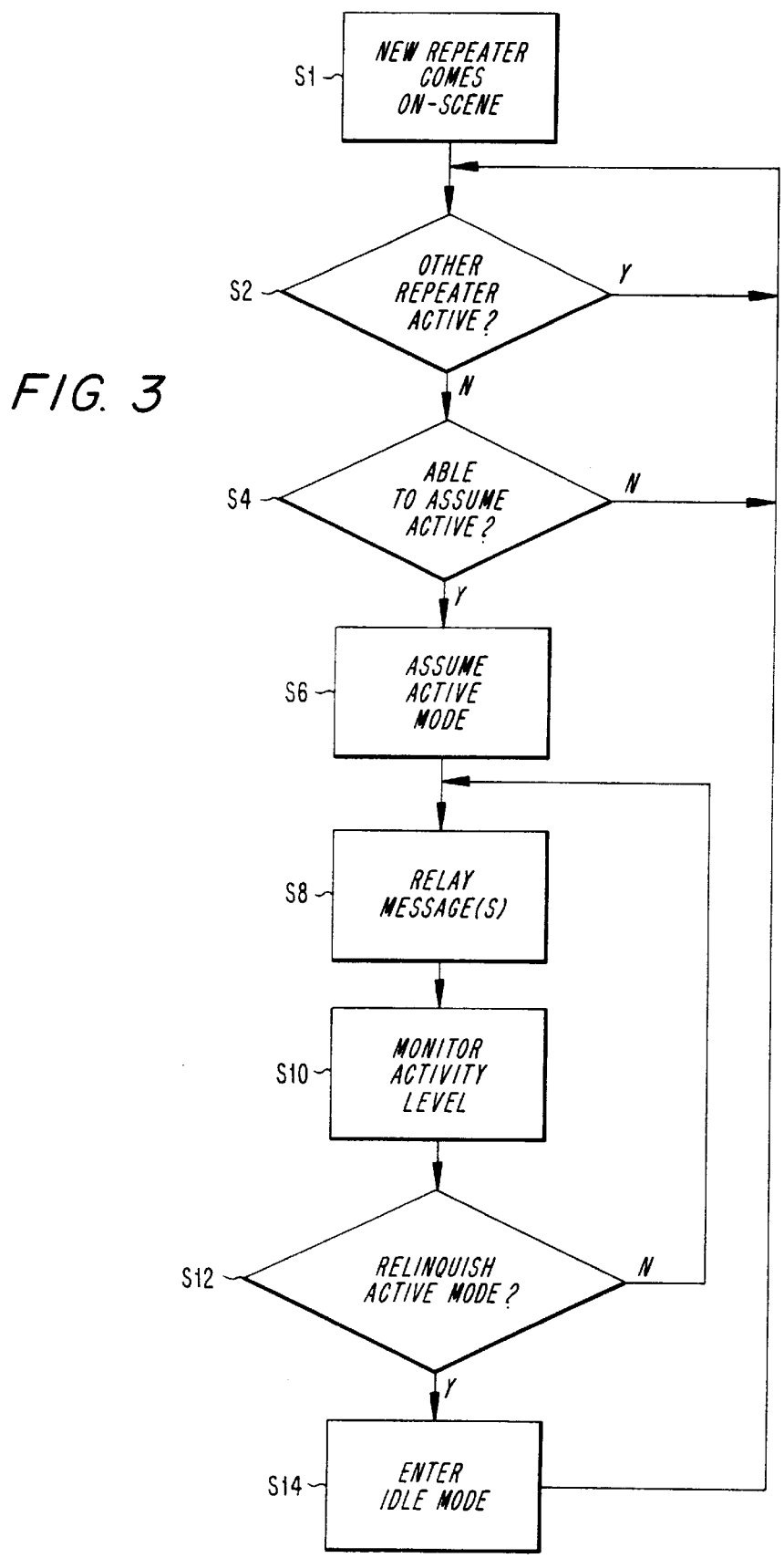
FIG. 3 shows an exemplary technique by which non-trunked repeaters assume and relinquish the role of priority repeater according to the present invention.

FIG. 3 shows an exemplary algorithm for use by the repeater 22 in deciding whether to relay messages from the portable radios to the base site. As shown there, when a new repeater comes on-scene (step S1) it assesses whether any other repeater is currently assigned the role of priority repeater (step S2), as may be ascertained by observing radio traffic associated with the active priority repeater. If no repeater is currently active, the newly arriving repeater assesses whether it is able to assume the role of priority repeater (step S4), and if so, assumes the role (step S6).

In the priority mode, a repeater relays all messages from the portable radios to the base site (step S8), followed by a step of monitoring an "activity level" of the repeater (step S10). The activity level generally corresponds to amount of "work" the repeater has performed since it was assigned the role of priority repeater. This activity level may correspond to the number of messages relayed to the base site, as accumulated in counter 40, or may correspond to amount of time since the repeater was assigned the role of priority repeater, as determined from timer 42. Alternatively, the activity level may correspond to the level of the battery 46, as determined from the battery sensing circuity 46. In other words, the degree to which the battery is depleted may be used as a proxy for the amount of time that the repeater has served as the priority repeater.

In step S12, the repeater 22 decides whether to relinquish the role of priority repeater. This decision can be based on any one of the above described variables, or any combination of the above described variables. For instance, the repeater 22 may relinquish its priority status simply on the basis of the number of messages logged in the counter 40. That is, when the number of messages exceeds a prescribed threshold, the repeater 22 transfers the role of priority repeater to another repeater. Similarly, the repeater 22 may base its decision solely on the value of the timer 42, or solely on the basis of the battery sensing circuitry 44. Alternatively, the repeater could monitor the output of the counter 40, the timer 42 and the battery sensing circuitry 44. When the output of any one of these components exceeds a threshold, the control logic 38 could be configured to transfer the role of priority status to another repeater.

When the repeater does relinquish its active status, it enters an idle mode (step S14). Thereafter, other repeaters sense the lack of repeater traffic in step S2, and another repeater assumes the priority role in response thereto (in steps S2, S4 and S6). There may be two or more candidate repeater stations which are able to take over the role of priority repeater. Various techniques may be used to choose between two or more contending repeaters. For instance, the technique proposed in U.S. Pat. No. 4,056,780 may be used to choose between contending repeaters, which is loosely based on assigning delay states corresponding to the order in which a repeater arrived on-scene. But unlike the technique proposed in that patent, the present invention will not deplete the battery supply of the priority repeater.

If no other repeater takes over, then the previous priority repeater may have to re-assume the priority role, providing it is able to re-assume the priority mode (as ascertained in step S4). Upon re-assuming the priority role, the repeater may be configured to zero its timer 42 and counter 40.

The repeater shown in FIG. 2 is intended to represent any type of trunked or non-trunked repeater system. One specific application of the above described principles is to the in-band vehicular repeater disclosed in Ser. No. 08/694,745, filed on Aug. 9, 1996. This patent application is incorporated herein by reference.

Figure 4:
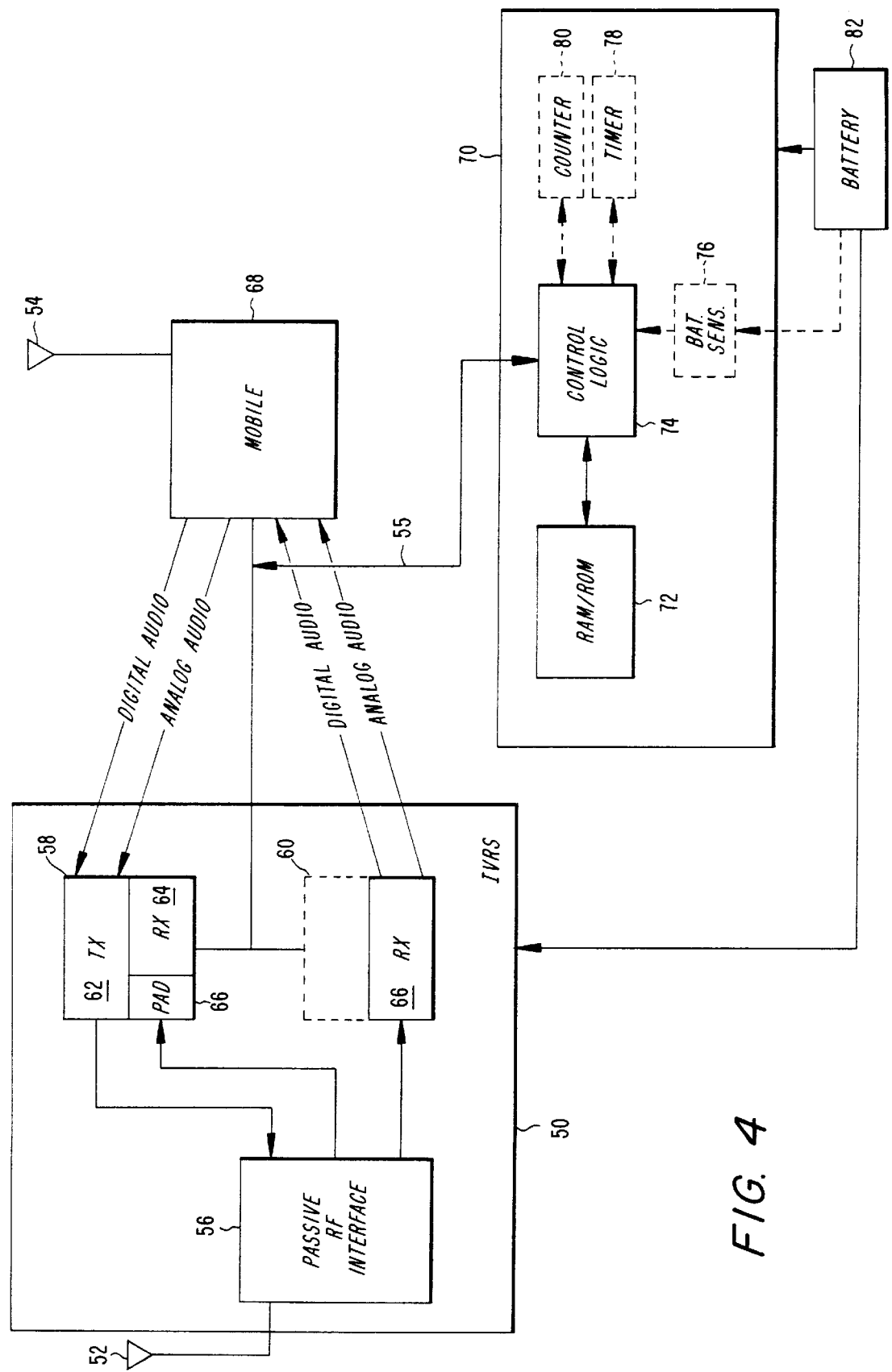
FIG. 4 shows an exemplary trunked vehicular repeater for use in the present invention.

As shown in FIG. 4, the in-band vehicular repeater system (referred to henceforth as IVRS 50) incudes a first radio 68 which serves as an operational radio located within the squad car vehicle. For example, radio 68 can be a squad car radio affixed to the dashboard of a police officer's vehicle used to convey messages to and from the officer while in his vehicle. Radio 68 communicates with the base site (not shown) using antenna 54.

In addition to radio 68, the vehicle also includes two additional radio units, identified herein as radio 58 and radio 60. Both of these radios are connected to a passive RF interface 56 and antenna 52. Antenna 52, in turn, communicates with users via their portable radios (not shown). Radios 58 and 60 are also connected, preferably by hard-wired link, to the vehicle radio 68. The radios 58 and 60 provide both analog and digital audio communication to avoid unnecessary digital to analog and analog to digital conversions of audio speech data when messages are routed through the repeater 50. Additionally, control is provided via a controller 70 in association with an interradio digital communication network, which is denoted by the dotted line 55.

A primary function of radio 58 is to forward information received from the base site to a portable radio. To this end, radio 58 employs a transmitter 58 for transmitting messages received from the base site to the portable radio using an operating power balanced for portable operation. A primary function of radio 60 is to receive messages from a portable radio, which messages are then forwarded to the squad car radio 68, and then to the base site. Hence radio 60 is shown as only including a receiving section 66 for receiving across the standard portable radio's transmit frequency range.

Radio 58 also includes a receiving section 64 with a low power PA (power amplifier) and additional receiver attenuation incorporated within the section denoted schematically as PAD 66 (e.g. attenuator). The low power PA and receiver attenuation prevent undesired reception of signals emanating from distant radio units. When an IVRS unit first comes on-scene or is otherwise activated, the receiver section 64 monitors which frequencies other nearby IVRS units are operating on. To prevent interference, the IVRS unit will not lock onto a control channel which another IVRS unit is already operating on, which is described more fully in Ser. No. 08/694,745. Instead of two radios within the IVRS system, the IVRS unit 50 may employ a single radio with duplex capability.

The control unit 70 includes control logic 74, which may comprise a conventional microprocessor governed by a program stored in memory 72. A counter 80, timer 78, and battery sensing circuitry 76 are communicatively tied to the control logic 74. A battery 82 supplies power to the system.

In operation, the repeater station communicates with the portable radio on a single trunked communication channel. By way of summary, in this system, the single channel operates alternatively in a control channel mode and in an assigned channel mode, with the idle mode being the control channel mode. When the repeater is idle, control channel signalling is transmitted over the single channel. When a channel request is received from a portable unit, the repeater transmits a channel assignment message to the portable radio and the single channel then begins operating as an assigned (working) channel. At the conclusion of the assigned channel communication, the single channel reverts to the control channel mode in readiness for further channel assignments.

Unlike the above described embodiment of FIG. 2, plural IVRS units may function simultaneously within a given geographic area by operating on different control channels. This distributes the burden of relaying messages to as many different repeaters as possible, and therefore reduces the processing load on any one repeater. Nevertheless, many times only one control channel is available, which requires a technique for choosing a priority repeater from amongst a plurality of on-scene repeaters.

Figure 5:
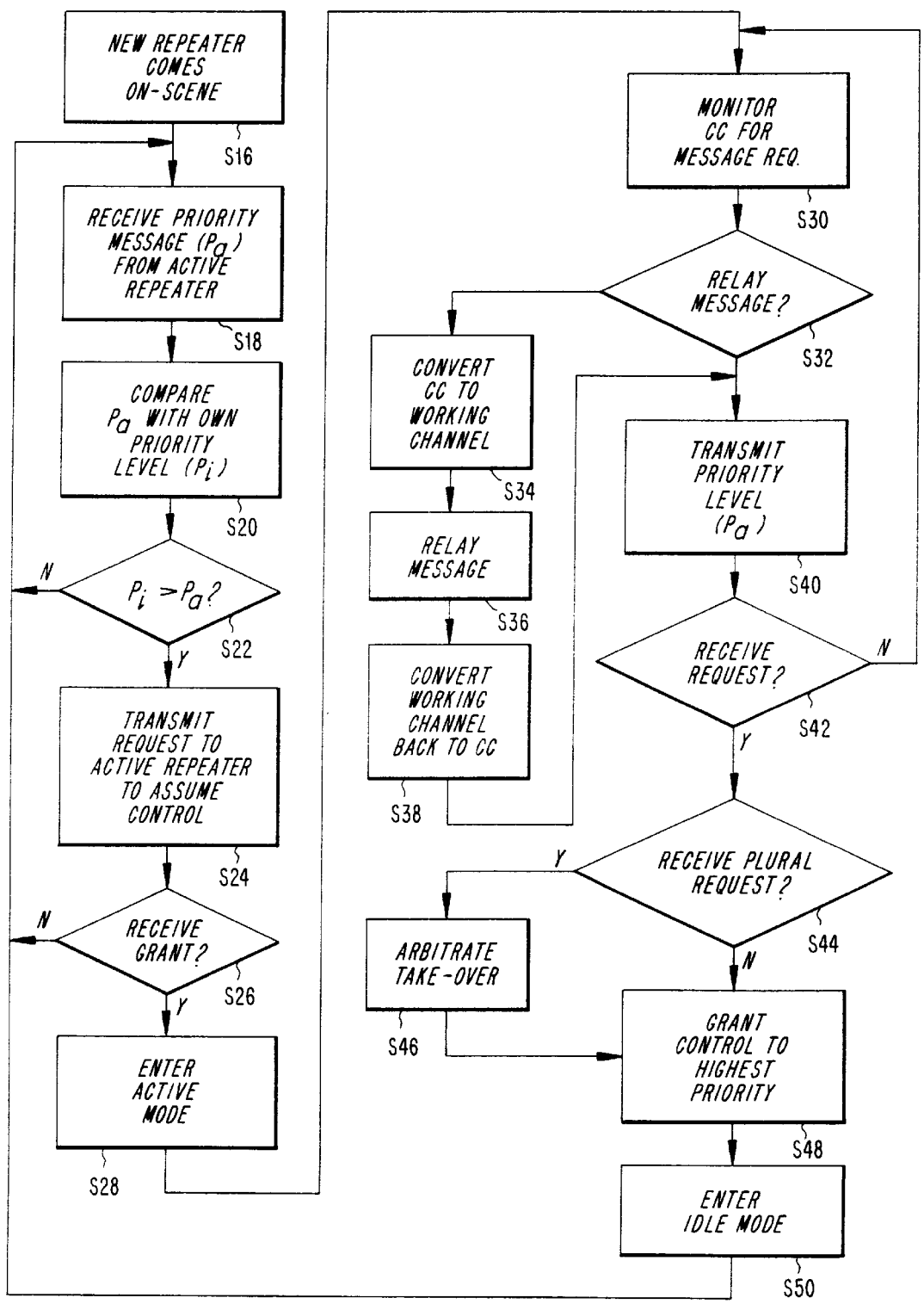
FIG. 5 shows an exemplary technique by which trunked repeaters assume and relinquish the role of priority repeater according to the present invention, using a single control channel.

FIG. 5 illustrates an exemplary technique for choosing a priority repeater in a trunked radio repeater. To facilitate discussion, FIG. 5 is based on the use of only one channel on which the repeater module communicates with the portable radios. However, the principles discussed in FIG. 5 extend to situations where plural repeaters are operating simultaneously on their own separate channels, as discussed more fully in FIG. 6.

As shown in FIG. 5, when a new vehicular repeater arrives on-scene (step S16) it receives a message from the active priority repeater, which indicates the priority level ($P_a$) of the active priority repeater (step S18). The priority level $P_a$ is a function of the activity level of the priority repeater, and may comprise any of the measurements discussed above in connection with FIGS. 2 and 3. For instance, the priority level $P_a$ may comprise a numerical value related to the remaining power of the battery 82, or may contain some proxy thereof, such as the number of messages that the repeater has transmitted or the time at which the priority repeater has operated, or some combination of these (or other) factors. For the sake of brevity, however, the priority level $P_a$ will be described as solely a function of the remaining battery supply of the battery 82. The priority repeater transmits indicia representative of its priority level on the control channel when the priority repeater is not busy relaying messages from the portable units to the base site.

After receiving the priority level $P_a$, the new repeater on the scene compares the priority level $P_a$ with its own priority level ($P_i$) (step S20). If its own priority level is greater than the priority level of the active repeater (step S22), the new repeater transmits a request to the active priority repeater (on the control channel) to take over the role of priority repeater (step S24). If the new repeater receives a grant from the active priority repeater (in step S26), it enters the active mode (in step S28), and itself become the active priority repeater.

Having assumed the role of priority repeater, the repeater goes about its normal job of relaying messages from the portable units to the base site. This comprises monitoring the control channel for the presence of request messages from the portable units (in step S30). If there is a request (as ascertained in step S32), the repeater converts the control channel to a working channel (in step S34), relays the message to the base site on the working channel (in step S36), and converts the working channel back to a control channel (in step S38). Thereafter, the priority repeater determines an updated priority level $P_a$, and transmits this priority level on the idle control channel to all idle repeaters in the vicinity (in step S40). It then waits to see if any idle repeater transmits a request (on the control channel) to take over the role of priority repeater (step S42). As previously described, this would indicate that there is at least one idle repeater in the vicinity which has a higher ranking priority level $P_i$. In step S44 the priority repeater determines whether more than one request was received. If so, the priority repeater chooses between the plurality of requests (in step S46). For example, the priority repeater may choose the requesting candidate repeater that has the highest priority level $P_i$, or the candidate repeater which transmitted its request first in time. Thereafter, the priority repeater relinquishes control to the chosen idle repeater (in step S48), and enters the idle state (step S50). The now idle repeater will then commence monitoring the messages from the new priority repeater (in step S18). Upon further depletion of the battery supply of the priority repeater, the now idle repeater may be once again called upon to re-assume the role of priority repeater.

When the repeaters have similar battery levels, the changeover from one active repeater to another will occur at rapid intervals, because it will not take much time before the active repeater's battery supply inches below the idle repeaters' battery supply levels. If this is undesirable, changeover can be delayed until the battery level drops below a prescribed increment. For example, the priority repeater may be restrained from relinquishing control (in step S48) until its battery supply drops to at least 5% below the level at which it assumed control.

Figure 6A:
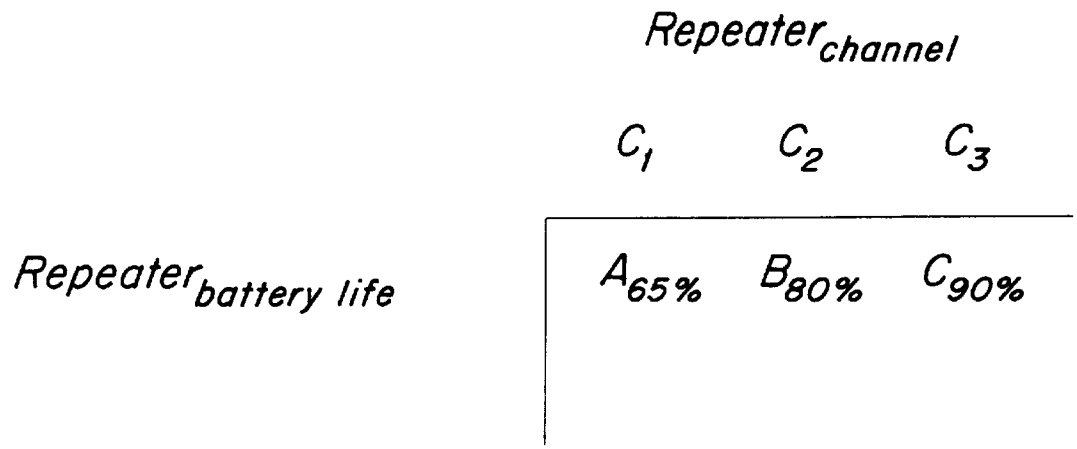
FIG. 6 shows an exemplary technique by which trunked repeaters assume and relinquish the role of priority repeater according to the present invention, using plural control channels.
Figure 6B:
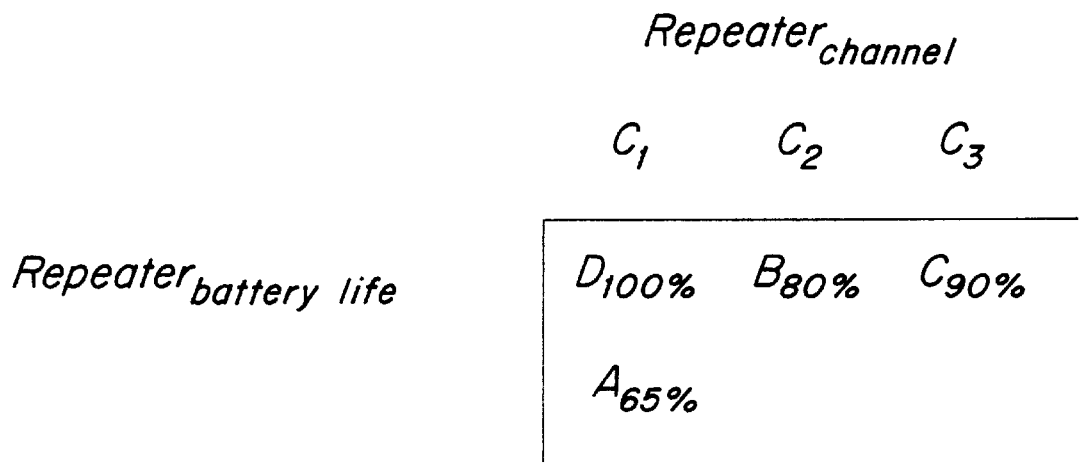

As noted above, the in-band vehicular repeater system discussed in co-pending application Ser. No. 08/694,745 may accommodate plural repeaters operating at the same time on different frequency channels. For example, as illustrated in FIG. 6(A), if three repeater channels are available ($C_1$, $C_2$ and $C_3$), the first three repeaters to arrive on scene (A, B, and C) will lock onto a separate channel. In FIG. 6(A), repeater A arrived first, followed by repeater B, and then repeater C. Upon arrival, repeaters B and C determined which frequencies were currently busy by sampling the radio traffic using their respective receivers 64, as was explained at length in the application Ser. No. 08/694,745. Each repeater (A, B and C) functions as a priority repeater, relaying messages from its respective group of portable radios to the base site. Thus, by dividing the processing load, the danger of depleting any one repeater's battery supply is reduced.

Yet the repeater battery levels may decrease at unequal rates depending on different levels of activity within each repeater's group of associated portable radios. Also, the first repeater to arrive on-scene (e.g. repeater A) will operated longer than repeaters which arrived later (e.g. repeaters B and C). Therefore, it is not surprising to see that repeater A's battery may be weaker than repeater B's and C's battery.

The above noted concerns can be remedied in many different ways. The portable radios may monitor the priority level of their assigned priority repeater, and shift to another repeater (having a better priority level) when they sense their assigned repeater's priority level drop below a prescribed threshold. This would reduce the processing load on this beleaguered repeater. More simply, a priority repeater may simply disable itself when it detects that its battery level has dropped below a prescribed threshold. This threshold might correspond to a minimum level required to start the engine of the vehicle. Disabling the repeater with a weak battery would then free a control channel, and allow another idle repeater to assume the role of priority repeater on this empty control channel.

In another embodiment, idle repeaters may continually monitor all of the control channels, and detect the priority levels ($P_a$'s) of all of the priority repeaters on channels $C_1$–$C_3$. If the idle repeater's priority level $P_i$ is greater than any priority repeater's priority level $P_a$, it will transmit a message to that priority repeater, requesting to assume the role of priority repeater on that control channel. If the idle repeater determines that it priority level $P_i$ is greater than more than one $P_a$, it may chose the priority repeater which is most in need of relief, and replace that priority repeater. For example, in FIG. 6(B), a newly arriving repeater D detects that repeater A has the lowest battery level. Therefore, repeater D transmits a message to repeater A, requesting repeater A to step down and allow repeater D to assume the role of priority repeater on that channel.

Thus, in the context of FIG. 5, step S18 could be broadened to encompass a step of receiving priority levels from all priority repeaters. Given the above-described principles, it will be evident to those skilled in the art that other load sharing strategies are possible.

More generally, the above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for relaying messages, using mobile repeaters, between a portable radio and a base site, comprising the steps of:
   determining a priority level for a first repeater which corresponds to the remaining power of said first repeater;
   determining a priority level of a second repeater which corresponds to the remaining power of said second repeater;
   comparing the remaining powers of said first and second repeaters to determine the repeater with the greatest remaining power; and
   transmitting a message between the portable radio and the base site using the repeater with the greatest remaining power.

2. The method of claim 1, wherein said repeater with the greatest remaining power communicates with said portable radio in a non-trunked protocol.

3. The method of claim 1, wherein said repeater with the greatest remaining power communicates with said portable radio in a trunked protocol.

4. The method of claim 1, wherein said repeater with the greatest remaining power communicates with said portable radio on a trunked channel, wherein said channel assumes a control state when idle, and a working state while used to communicate with said portable radio.

5. The method of claim 4, wherein said repeater receives a message from one other repeater on said trunked channel in said control state, while said repeater is in a non-priority state, wherein said message contains information regarding a priority level of said other repeater operating in its priority state.

6. The method of claim 5, wherein said repeater compares said priority level of said other repeater with its own priority level, and said repeater decides to transition from said non-priority state to said priority state on the basis of said comparison.

7. The method of claim 1, wherein the priority levels of said first and second repeaters are based on sensed battery levels of said first and second repeaters, respectively.

8. A system for relaying messages, using mobiles repeaters, between a portable radio and a base site, comprising:
   means for determining a priority level for a first repeater which corresponds to the remaining power of said first repeater;
   means for determining a priority level of a second repeater which corresponds to the remaining power of said second repeater;
   means for comparing the remaining powers of said first and second repeaters to determine the repeater with the greatest remaining power; and
   means for transmitting a message between the portable radio and the base site using the repeater with the greatest remaining power.

9. The system of claim 8, wherein said repeater with the greatest remaining power communicates with said portable radio in a non-trunked protocol.

10. The system of claim 8, wherein said repeater with the greatest remaining power communicates with said portable radio in a trunked protocol.

11. The system of claim 10, wherein said repeater communicates with said portable radio on one of a plurality of available trunked channels.

12. The system of claim 8, wherein said repeater with the greatest remaining power communicates with said portable radio on a trunked channel, wherein said channel assumes a control state when idle, and a working state while used to communicate with said portable radio.

13. The system of claim 12, wherein said repeater receives a message from one other repeater on said trunked channel in said control state, while said repeater is in a non-priority state, wherein said message contain information regarding a priority level of said one other repeater operating in its priority state.

14. The system of claim 13, wherein said repeater compares said priority level of said one other repeater with its own priority level, and said repeater decides to transition from said non-priority state to said priority state on the basis of said comparison.

15. The system of claim 8, wherein the priority levels of said first and second repeaters are based on sensed battery levels of said first and second repeaters, respectively.

* * * * *

UNITED STATES PATENT AND TRADEMARK OFFICE
CERTIFICATE OF CORRECTION

PATENT NO. : 6,169,880 B1　　　　　　　　　　　　　　　　　　　　Page 1 of 1
DATED : January 2, 2001
INVENTOR(S) : Laurence A. LaFratta et al.

It is certified that error appears in the above-identified patent and that said Letters Patent is hereby corrected as shown below:

Column 9,
Line 32, replace "method" with -- system --;
Line 38, replace "repeater" with -- system --;
Line 39, after "said" insert -- one --;

Column 10,
Line 30, replace "system" with -- method --;
Line 33, replace "contain" with -- contains --.

Signed and Sealed this

Second Day of October, 2001

Attest:

*Attesting Officer*

NICHOLAS P. GODICI
*Acting Director of the United States Patent and Trademark Office*